(12) United States Patent
Torres et al.

(10) Patent No.: US 12,504,107 B2
(45) Date of Patent: Dec. 23, 2025

(54) QUICK DISCONNECT ADAPTER

(71) Applicant: CARRIER CORPORATION, Palm Beach Gardens, FL (US)

(72) Inventors: Gustavo Torres, Bartlett, TN (US); Amanda Welch, Southaven, MS (US); Zachary Wood, Germantown, TN (US); Joshua Vickers, Bartlett, TN (US); Larry Pugh, Rossville, TN (US); Xiao Chen, Arlington, TN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 640 days.

(21) Appl. No.: 17/903,569

(22) Filed: Sep. 6, 2022

(65) Prior Publication Data

US 2023/0077622 A1    Mar. 16, 2023

Related U.S. Application Data

(60) Provisional application No. 63/242,782, filed on Sep. 10, 2021.

(51) Int. Cl.
*F16L 37/20*      (2006.01)
*F16L 55/115*     (2006.01)
(Continued)

(52) U.S. Cl.
CPC .......... *F16L 37/20* (2013.01); *F16L 55/1157* (2013.01); *G01M 3/022* (2013.01); *G01M 3/22* (2013.01); *G01M 3/222* (2013.01); *G01M 3/229* (2013.01)

(58) Field of Classification Search
CPC ....... B23B 31/201; B23B 31/206; B60S 5/04; G01M 3/022; G01M 3/22; G01M 3/222; G01M 3/229; G01M 3/2846; F16K 15/20; F16L 19/07; F16L 19/075; F16L 19/083; F16L 27/1273; F16L 33/227; F16L 37/02; F16L 37/04; F16L 37/05; F16L 37/084; F16L 37/0842; F16L 37/0887; F16L 37/092; F16L 37/0927; F16L 37/096; F16L 37/101; F16L 37/121; F16L 37/1215;
(Continued)

(56) References Cited

U.S. PATENT DOCUMENTS 1,340,785 A * 5/1920 Mcmullin ............... F16L 37/05
                                                        285/322
1,784,821 A * 12/1930 Crowley ................. F16K 31/58
                                                        411/433
(Continued)

FOREIGN PATENT DOCUMENTS

GB            292362 A  *  6/1928   ........... B60C 29/064

*Primary Examiner* — Kenneth Rinehart
*Assistant Examiner* — Richard K. Durden
(74) *Attorney, Agent, or Firm* — CANTOR COLBURN LLP

(57) ABSTRACT

A fitting assembly includes a fitting comprising a housing and a connector assembly arranged within the housing. The connector assembly comprising a hollow interior and configured to be movable between an unactuated position and an actuated position. In the actuated position, the connector assembly is connectable to a pipe receivable within the hollow interior. An adapter coupled to the fitting includes a biasing mechanism configured to bias the connector assembly from the actuated position to the unactuated position.

16 Claims, 5 Drawing Sheets

(51) Int. Cl.
*G01M 3/02* (2006.01)
*G01M 3/22* (2006.01)

(58) Field of Classification Search
CPC ... F16L 37/127; F16L 37/1286; F16L 37/138; F16L 37/18; F16L 37/20; F16L 37/44; F16L 55/1157; Y10T 137/3724; Y10T 279/1062; Y10T 279/1066; Y10T 279/1073; Y10T 279/17094; Y10T 279/17376; Y10T 279/17529
USPC ...... 279/50, 120; 285/8, 33, 34, 35, 85, 232, 285/243, 275, 308, 309, 311, 312, 315, 285/316, 322, 324, 345, 346, 358, 375, 285/394; 294/86.28
See application file for complete search history.

(56) References Cited

U.S. PATENT DOCUMENTS

| | | | | |
|---|---|---|---|---|
| 1,784,822 | A * | 12/1930 | Crowley | F16K 31/58 285/391 |
| 1,845,882 | A * | 2/1932 | Litschge | F16L 37/107 285/361 |
| 2,383,156 | A * | 8/1945 | Phillips | B23B 31/201 279/51 |
| 2,403,768 | A * | 7/1946 | Stoner | B23B 31/20125 279/71 |
| 2,477,773 | A * | 8/1949 | Soussloff | B23B 31/2072 279/4.09 |
| 2,883,200 | A * | 4/1959 | Smith | B23B 31/202 279/58 |
| 3,724,563 | A * | 4/1973 | Wickham | B23B 31/2073 173/221 |
| 3,779,587 | A * | 12/1973 | Racine | F16L 37/18 285/179 |
| 3,799,207 | A * | 3/1974 | Richardson | F16L 55/10 138/89 |
| 3,868,132 | A * | 2/1975 | Racine | F16L 37/18 473/298 |
| 3,923,325 | A * | 12/1975 | Slater, Jr. | F16L 37/18 285/423 |
| 3,926,205 | A * | 12/1975 | Gourlet | F16L 37/05 137/533.17 |
| 4,154,465 | A * | 5/1979 | Van Meter | F16L 37/18 285/338 |
| 4,202,102 | A * | 5/1980 | Nakanishi | A61C 1/14 279/51 |
| 4,225,159 | A * | 9/1980 | Van Meter | F16L 55/132 285/104 |
| 4,254,801 | A * | 3/1981 | Gerthoffer | F16L 55/1157 285/918 |
| 4,447,077 | A * | 5/1984 | Palmer | F16L 37/62 285/104 |
| 4,716,938 | A * | 1/1988 | Weh | F16L 37/1215 138/93 |
| 4,904,001 | A * | 2/1990 | Sasa | F16L 37/101 285/903 |
| 5,087,086 | A * | 2/1992 | Snedeker | F16L 37/107 285/361 |
| 5,507,537 | A * | 4/1996 | Meisinger | F16L 37/05 285/346 |
| 5,799,985 | A * | 9/1998 | Murphy | F16L 37/138 285/38 |
| 6,076,544 | A * | 6/2000 | Pierce | F16L 37/18 251/149.8 |
| 6,105,600 | A * | 8/2000 | Wang | B60S 5/04 137/231 |
| 6,289,920 | B1 * | 9/2001 | Wang | F16L 37/18 251/65 |
| 6,530,605 | B1 * | 3/2003 | Weh | F16L 37/20 285/308 |
| 2008/0236675 | A1 * | 10/2008 | Wang | F04B 33/005 137/231 |
| 2011/0303593 | A1 * | 12/2011 | Reinhardt | G01N 30/6039 210/143 |
| 2013/0181445 | A1 * | 7/2013 | Glime | F16L 19/061 285/337 |
| 2014/0291986 | A1 * | 10/2014 | Racine | F16L 37/18 285/345 |

* cited by examiner

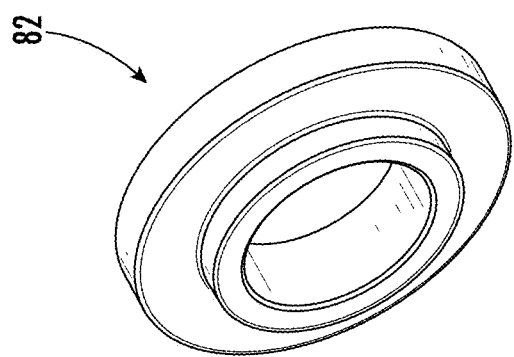
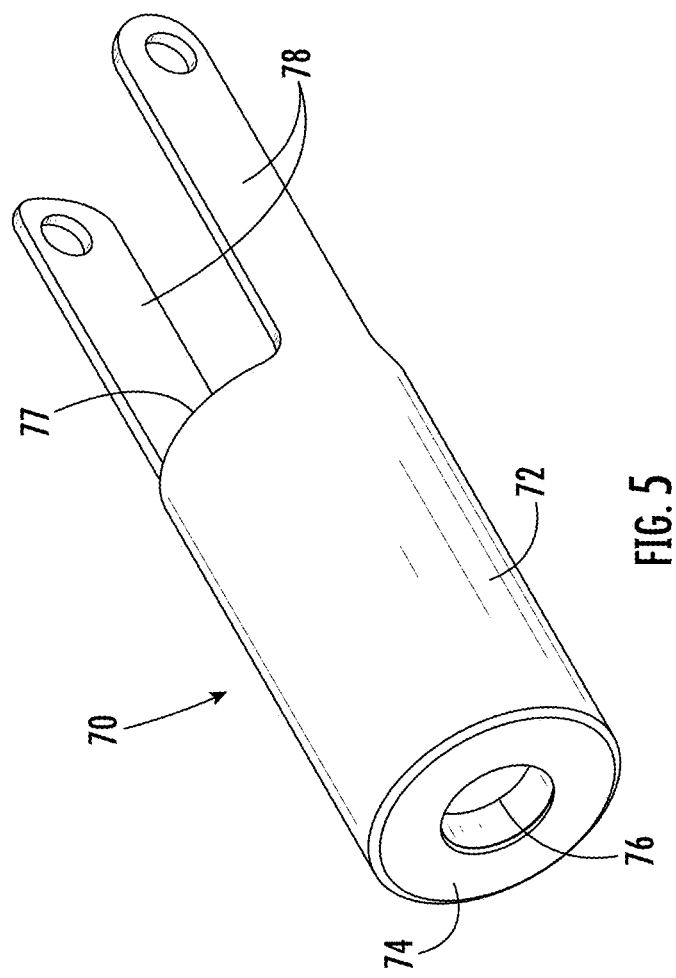

QUICK DISCONNECT ADAPTER

CROSS-REFERENCE TO RELATED APPLICATIONS

This application claims the benefit of U.S. Provisional Application No. 63/242,782 filed Sep. 10, 2021, the disclosure of which is incorporated herein by reference in its entirety.

BACKGROUND

Embodiments of the present disclosure relate generally to heat exchangers for use in a heating, ventilation, and air conditioning (HVAC) system and, more particularly, to a method and apparatus for leak testing of heat exchangers to be charged with refrigerant.

Heat exchanger coils are commonly used in HVAC systems. Because the number of tubes typically used in a heat exchanger coil and the complexity of the process of fabricating a heat exchanger, the heat exchanger coil is one of the most likely places for a leak to occur. Any significant leakage of refrigerant from within the heat exchanger coil would affect operation of the HVAC system, thereby requiring maintenance to repair or possible replace the leaking coil. Accordingly, heat exchangers are commonly leak tested for quality control purposes.

One known method of leak testing is to pressure the heat exchanger with a trace gas. Any leaks that are present in the heat exchanger can be detected and located using an appropriate sensing device. One common approach is to use a stable inert gas, such as helium, in combination with a helium detector. In such a system, a precise fitting is connected to the inlet and outlet ends of the heat exchanger coil to avoid false leak indication. However, these precise fittings are difficult to remove from the inlet and outlet ends once the test is completed, and often require frequent cleaning. In addition, the inlet and outlet ends of the heat exchanger coil may be damaged or scratched by the fitting during this removal process.

BRIEF DESCRIPTION

According to an embodiment, a fitting assembly includes a fitting comprising a housing and a connector assembly arranged within the housing. The connector assembly comprising a hollow interior and configured to be movable between an unactuated position and an actuated position. In the actuated position, the connector assembly is connectable to a pipe receivable within the hollow interior. An adapter coupled to the fitting includes a biasing mechanism configured to bias the connector assembly from the actuated position to the unactuated position.

In addition to one or more of the features described above, or as an alternative to any of the foregoing embodiments a diameter of the hollow interior when the connector assembly is in the unactuated position is greater than the diameter of the hollow interior when the connector assembly is in the actuated position.

In addition to one or more of the features described above, or as an alternative to any of the foregoing embodiments the fitting further comprises a lever movable between a first position and a second position relative to the housing, wherein the connector assembly is movable from the unactuated position to the actuated position in response to movement of the lever from the first position to the second position.

In addition to one or more of the features described above, or as an alternative to any of the foregoing embodiments the lever is rotatable about an axis between the first position and the second position.

In addition to one or more of the features described above, or as an alternative to any of the foregoing embodiments the adapter further comprises an adapter housing, the biasing mechanism being arranged within the adapter housing and a washer connected to an end of the biasing mechanism, the washer being disposed between the biasing mechanism and the connector assembly.

In addition to one or more of the features described above, or as an alternative to any of the foregoing embodiments the lever is connected to the housing via a pin and the adapter housing has a plurality of elongated mounting arms, the plurality of elongated mounting arms being connected to the housing via the pin.

In addition to one or more of the features described above, or as an alternative to any of the foregoing embodiments a portion of the washer is receivable within an interior of the biasing mechanism.

In addition to one or more of the features described above, or as an alternative to any of the foregoing embodiments the biasing mechanism is at least partially compressed by the housing.

In addition to one or more of the features described above, or as an alternative to any of the foregoing embodiments the connector assembly is a collet assembly.

In addition to one or more of the features described above, or as an alternative to any of the foregoing embodiments the connector assembly further comprises a collet body and a spring ring arranged at an interior surface of the collet body, the spring ring being biased radially outwardly.

In addition to one or more of the features described above, or as an alternative to any of the foregoing embodiments the connector assembly further comprises a wear ring disposed between the housing and an exterior of the collet body, wherein the collet body is configured to engage the wear ring as the connector assembly transforms from the unactuated position to the actuated position.

According to an embodiment, a method of disconnecting a pipe from a fitting assembly includes providing a fitting comprising a housing, a lever, and a connector assembly and providing an adapter coupled to the fitting, the pipe extending through the adapter to the connector assembly, moving the lever relative to the housing between a first position and a second position, biasing the connector assembly via a biasing force from an actuated position to an unactuated position via the adapter, and removing the pipe from the fitting and the adapter.

In addition to one or more of the features described above, or as an alternative to any of the foregoing embodiments the moving the lever of the fitting relative to the housing further comprises rotating the lever about an axis relative to the housing.

In addition to one or more of the features described above, or as an alternative to any of the foregoing embodiments when the adapter further comprises a spring that applies the biasing force to the connector assembly, the method further comprising opposing the biasing force acting on the connector assembly when the lever is in the second position.

In addition to one or more of the features described above, or as an alternative to any of the foregoing embodiments biasing the connector assembly from the actuated position to the unactuated position occurs automatically in response to moving the lever from the second position to the first position.

In addition to one or more of the features described above, or as an alternative to any of the foregoing embodiments biasing the connector assembly from the actuated position to the unactuated position further comprises biasing a spring ring of the connector assembly radially outwardly.

In addition to one or more of the features described above, or as an alternative to any of the foregoing embodiments an inner diameter of the connector assembly when in the actuated position is smaller than the inner diameter of the connector assembly when in the unactuated position.

BRIEF DESCRIPTION OF THE DRAWINGS

The following descriptions should not be considered limiting in any way. With reference to the accompanying drawings, like elements are numbered alike:

FIG. 5 is a perspective view of an exemplary adapter for use in the fitting assembly shown in FIG. 2 according to an embodiment; and FIG. 6 is a perspective view of a washer for use in the adapter shown in FIG. 5 according to an embodiment.

DETAILED DESCRIPTION

A detailed description of one or more embodiments of the disclosed apparatus and method are presented herein by way of exemplification and not limitation with reference to the Figures.

Figure 1:
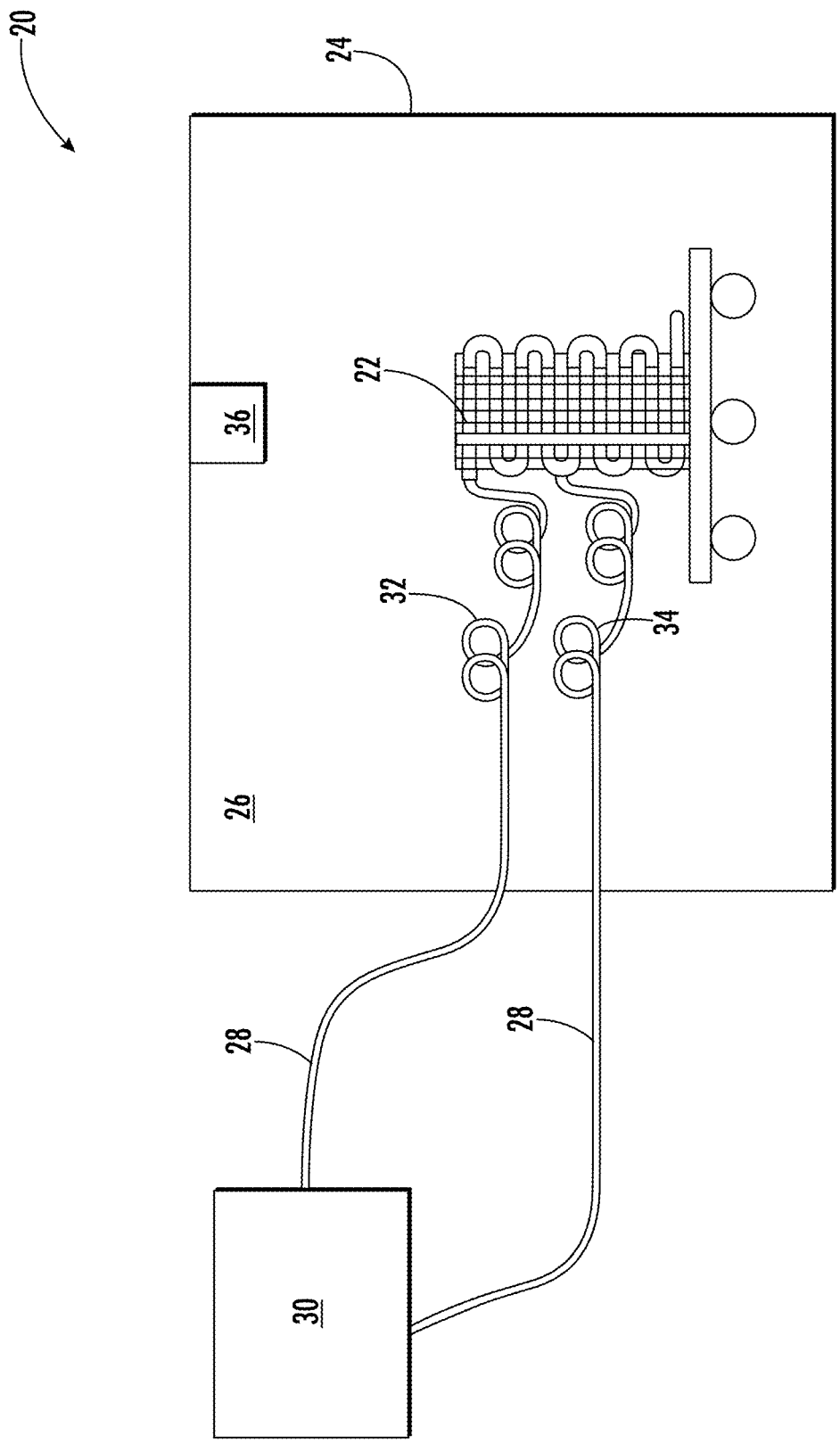
FIG. 1 is a schematic illustration of an exemplary embodiment of a leak detection system.

With reference now to FIG. 1, an example of a system 20 for detecting when a leak is present in a heat exchanger coil 22 is illustrated. As shown, the heat exchanger coil 22 is arranged within the interior 26 of a container or testing booth 24. A hose or conduit 28 extends from and fluidly connects a supply tank 30 of a trace gas to an inlet end or line 32 of the heat exchanger coil 22. As used herein, the term "trace gas" can be used to describe any fluid that is suitable for this purpose, including but not limited to refrigerant, and helium for example. Another hose or conduit 28 is fluidly connected to the outlet end or line 34 of the heat exchanger coil 22 and may be configured to return a flow of trace gas from the heat exchanger coil 22 to the supply tank 30. A trace gas sensor 36, also referred to herein as a leak detector sensor, is similarly arranged within the interior 26 of the testing booth 24. The trace gas sensor 36 is selected to monitor the environment of the interior 26 of the testing booth 24 for the presence of trace gas, and therefore must be appropriate for use with the specific type of trace gas being used in an application. During a test, the trace gas is configured to circulate through a closed loop formed between the supply tank 30 and the heat exchanger coil 22. In the event that the heat exchanger coil 22 has one or more leaks therein, as the trace gas flows through the heat exchanger coil 22, a portion of the gas will flow out of the one or more leaks into the interior 26 of the testing booth 24, surrounding the heat exchanger coil 22. This trace gas will be detected by trace gas sensor 36 and will indicate that the heat exchanger coil 22 is unsuitable for use in its current condition.

The inlet 32 of the heat exchanger coil 22 is connected to hose 28, and the outlet 34 of the heat exchanger coil 22 is connected to hose 28 via a respective fitting. The fittings at each interface may, but need not be substantially identical. With reference now to FIGS. 2-6, an example of a fitting assembly 40 such as suitable for use in a leak detection system 20 of a heat exchanger coil 22 is illustrated in more detail. In the illustrated, non-limiting embodiment, the fitting assembly 40 includes a housing 42 and a lever 44 mounted to a portion of the housing 42 for movement between a first position (FIG. 2) and a second position (FIG. 3). Although the lever 44 is illustrated as being rotatable relative to the housing 42 about an axis, embodiments where the lever 44 is configured to move relative to the housing 42 in another manner, for example translate inwardly and outwardly along an axis X of the housing 42, are also within the scope of the disclosure.

Figure 4:
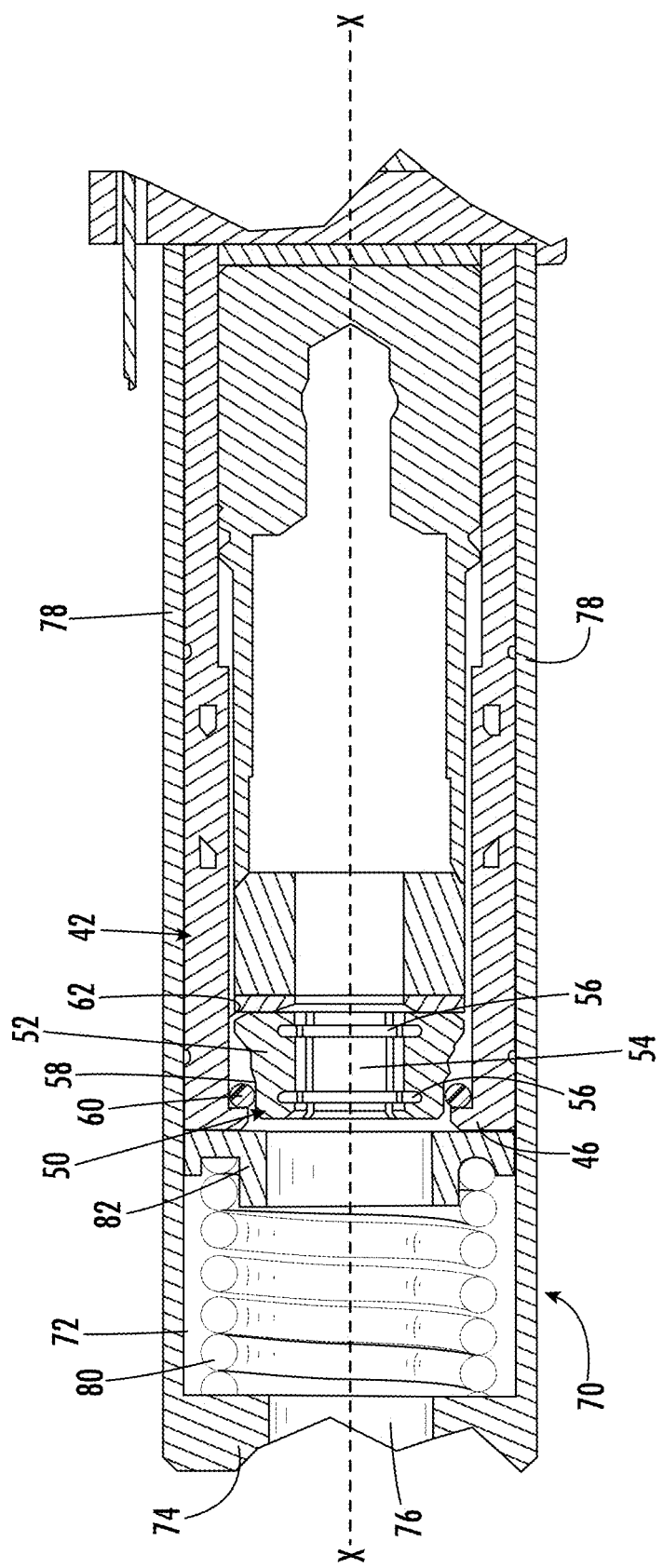
FIG. 4 is a cross-sectional view of a portion of the exemplary fitting assembly shown in FIG. 2 taken along line A-A according to an embodiment.

As best shown in FIG. 4, arranged within the interior of the housing 42, such as adjacent an end 46 of the housing 42 for example, is a connector assembly 50. In the illustrated, non-limiting embodiment, the connector assembly 50 is a collet assembly including a collet body 52 having a hollow interior 54 and one or more spring rings 56 mounted at an inner surface thereof. The exterior surface 58 of the collet body 52 may be tapered and the spring ring(s) 56 may be biased radially outwardly toward the collet body 52. The collet assembly 50 may further include a wear ring 60 disposed between the exterior 58 of the collet body 52 and the interior surface 62 of the housing 42.

As the lever 44 is moved from the first position to the second position, the lever 44 is configured to apply a force to the collet assembly 50 causing the collet body 52 to translate along the axis X of the housing 42, toward the end 46 thereof. As the collet body 52 moves to an actuated position, the contact between the collet body 52 and the wear ring 60 causes the collet body 52 to move inwardly, thereby reducing the inner and outer diameters of the collet body 52. Accordingly, the engagement of the collet body 52 with the wear ring 60 causes the collet body 52 to grip something such as a pipe, tube, or other fluid connector receivable within the hollow interior thereof. Once the lever 44 is returned to the first position, the force acting on the collet assembly 50 is removed. Accordingly, when the lever is in the first position, the collet assembly is free to translate or move back to an unactuated position. A fitting assembly 40 having a connector assembly 50 as described herein is known. Further, the connector assembly 50 illustrated and described herein is intended as an example only, and it should be understood that any suitable fitting assembly 40 having a connector assembly of any configuration that is transformable between a first, unactuated position and a second, actuated position in which the connector assembly grips a pipe or conduit receivable therein is within the scope of the disclosure.

Figure 2:
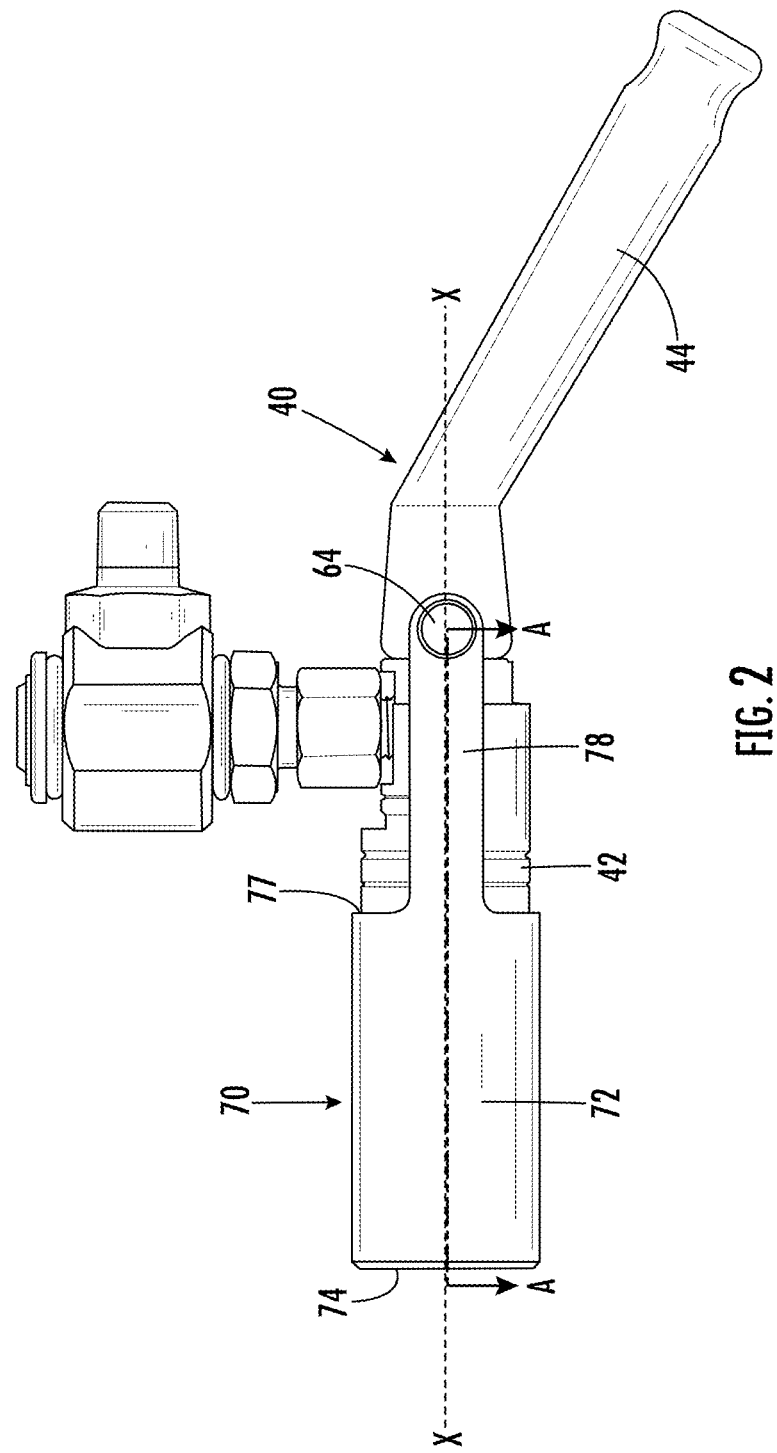
FIG. 2 is a side view of an exemplary fitting assembly in an unactuated position, the fitting assembly including an adapter according to an embodiment.
Figure 3:
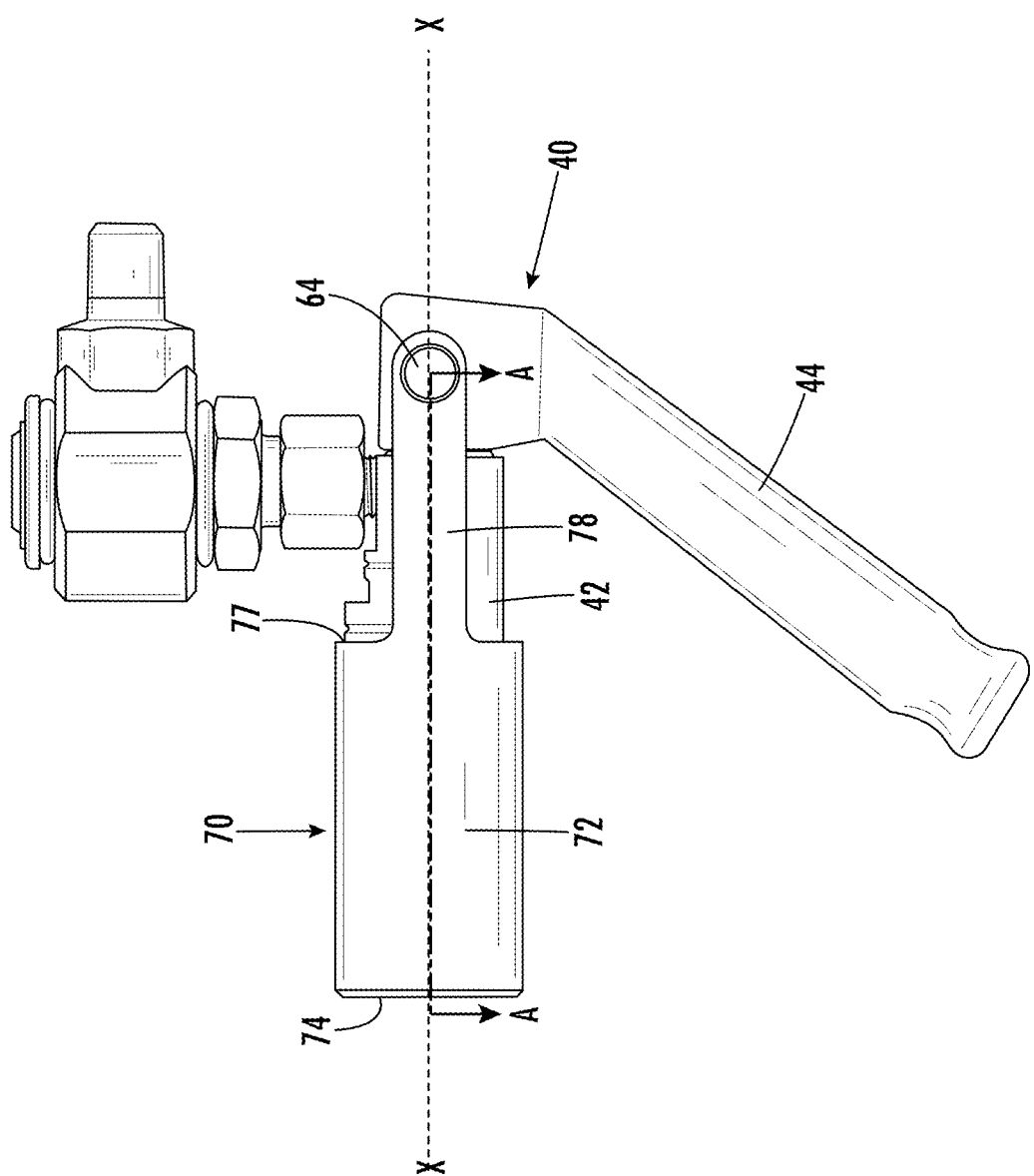
FIG. 3 is a side view of an exemplary fitting assembly in an actuated position, the fitting assembly including an adapter according to an embodiment.

With continued reference to FIGS. 2-4 and further reference to FIGS. 5 and 6, in the illustrated, non-limiting embodiment, the fitting assembly 40 additionally includes an adapter 70 connectable to the housing 42 of the fitting assembly 40. In an embodiment, the adapter 70 is connectable to the same pin 64 that couples the lever 44 to the housing 42 and that defines the axis of rotation of the lever 44 relative to the housing 42. However, the adapter 70 may be connected to the housing 42 at any location.

The adapter 70 includes a generally cylindrical adapter housing 72 having an inner diameter substantially equal to or slightly larger than the outer diameter of the housing 42 of the fitting assembly 40. A first end 74 of the adapter housing 72 may be partially sealed. However, the first end 74 of the adapter housing 72 has a through hole 76 formed therein that is configured to align with the hollow interior of the collet assembly 50 along axis X when the adapter 70 is mounted to the fitting assembly 40. One or more elongated mounting arms 78 may extend from the second opposite end 77 of the adapter housing 72. This plurality of mounting arms 78 may be integrally formed with, or alternatively, coupled to the adapter housing 72. As shown, the mounting arms 78 may be disposed opposite one another such that each mounting arm 78 is positionable in line with the rotational axis of the pin 64.

A biasing mechanism 80, such as a coil spring for example, is arranged within the interior of the adapter housing 72 and is seated against the partially sealed first end 74. A washer 82 is mounted to the distal end of the biasing mechanism 80, between the biasing mechanism 80 and the end 46 of the housing 42. In an embodiment, the washer 82 is configured to contact a portion, such as the end for example, of the collet body 52. As shown, a cross-section of the washer may have an L-shape such that a first portion of the washer extends within the interior of the biasing mechanism and the second portion of the washer is arranged As shown, when the adapter 70 is coupled to the fitting assembly 40, the biasing mechanism 80 is at least partially compressed by the housing 42. As a result, the biasing mechanism 80 and the washer 82 connected thereto apply a load on the housing and on the collet body 52. When the lever 44 is in the second position, the collet body 52 is held in the second, actuated position, against the force of the biasing mechanism 80 and the washer 82.

A method of disconnecting a pipe or end from the fitting includes moving the lever 44 to the first position. In response to this movement, the biasing force of the biasing mechanism 80 will be applied to the collet body 52 via the washer 82. As a result of this biasing force, the collet body 52 is actively translated along the axis X to the first position. Further, as the collet body 52 translates away from the end 46, the biasing force of the spring rings 56 will cause the inner diameter of the collet body 52 to open, thereby disengaging or releasing a pipe or conduit from the collet body 52.

In existing fittings, the connector assembly does not automatically disengage or release a pipe or conduit arranged therein when the lever is released or moved to the second position. Accordingly, an adapter as illustrated and described herein facilitates this separation by automatically and actively biasing the connector assembly 50 from the actuated position to the unactuated position, once the lever 44 is moved from the second position to the first position. As a result, when the adapter is applied to the fitting assembly 40 in a leak detection setup, the overall time required to setup and perform a leak detection and the cleaning frequency of the fitting assembly 40 are significantly reduced. In addition, the adapter 70 reduces the likelihood that the copper pipe or conduit may be scratched or damaged as a result of engagement with the spring rings 56 during removal of the pipe or conduit.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fitting assembly comprising:
   a fitting comprising a housing and a connector assembly arranged within the housing, the connector assembly comprising a hollow interior and configured to be movable between an unactuated position and an actuated position, wherein a pipe is receivable within the hollow interior of the connector assembly, the pipe being gripped by the connector assembly when in the actuated position, wherein a diameter of the hollow interior of the connector assembly in the unactuated position is greater than the diameter of the hollow interior of the connector assembly in the actuated position; and
   an adapter coupled to the fitting, the adapter including a biasing mechanism configured to bias the connector assembly from the actuated position to the unactuated position.

2. The fitting assembly of claim 1, wherein the fitting further comprises a lever movable between a first position and a second position relative to the housing, wherein the connector assembly is movable from the unactuated position to the actuated position in response to movement of the lever from the first position to the second position.

3. The fitting assembly of claim 2, wherein the lever is rotatable about an axis between the first position and the second position.

4. The fitting assembly of claim 2, wherein the adapter further comprises:
   an adapter housing, the biasing mechanism being arranged within the adapter housing; and
   a washer connected to an end of the biasing mechanism, the washer being disposed between the biasing mechanism and the connector assembly.

5. The fitting assembly of claim 4, wherein the lever is connected to the housing via a pin and the adapter housing has a plurality of elongated mounting arms, the plurality of elongated mounting arms being connected to the housing via the pin.

6. The fitting assembly of claim 4, wherein a portion of the washer is receivable within an interior of the biasing mechanism.

7. The fitting assembly of claim 1, wherein the biasing mechanism is at least partially compressed by the housing.

8. The fitting assembly of claim 1, wherein the connector assembly is a collet assembly.

9. The fitting assembly of claim 8, wherein the connector assembly further comprises:
 a collet body; and
 a spring ring arranged at an interior surface of the collet body, the spring ring being biased radially outwardly.

10. The fitting assembly of claim 9, wherein the connector assembly further comprises a wear ring disposed between the housing and an exterior of the collet body, wherein the collet body is configured to engage the wear ring as the connector assembly transforms from the unactuated position to the actuated position.

11. A method of disconnecting a pipe from a fitting assembly comprising:
 providing a fitting comprising a housing, a lever, and a connector assembly and providing an adapter coupled to the fitting, the pipe extending through the adapter to the connector assembly;
 moving the lever relative to the housing between a first position and a second position;
 biasing the connector assembly via a biasing force from an actuated position to an unactuated position via the adapter, wherein biasing the connector assembly from the actuated position to the unactuated position further comprises biasing a spring ring of the connector assembly radially outwardly; and
 removing the pipe from the fitting and the adapter.

12. The method of claim 11, wherein the moving the lever of the fitting relative to the housing further comprises rotating the lever about an axis relative to the housing.

13. The method of claim 11, wherein the adapter further comprises a spring that applies the biasing force to the connector assembly, the method further comprising opposing the biasing force acting on the connector assembly when the lever is in the second position.

14. The method of claim 13, wherein biasing the connector assembly from the actuated position to the unactuated position occurs automatically in response to moving the lever from the second position to the first position.

15. The method of claim 11, wherein an inner diameter of the connector assembly when in the actuated position is smaller than the inner diameter of the connector assembly when in the unactuated position.

16. A method of disconnecting a pipe from a fitting assembly comprising:
 providing a fitting comprising a housing, a lever, and a connector assembly and providing an adapter coupled to the fitting, the pipe extending through the adapter to the connector assembly;
 moving the lever relative to the housing between a first position and a second position;
 biasing the connector assembly via a biasing force from an actuated position to an unactuated position via the adapter; and
 removing the pipe from the fitting and the adapter;
 wherein an inner diameter of the connector assembly when in the actuated position is smaller than the inner diameter of the connector assembly when in the unactuated position.

* * * * *